United States Patent
Dahlberg

[11] Patent Number: 5,335,151
[45] Date of Patent: Aug. 2, 1994

[54] MARKER LIGHT
[76] Inventor: Anders Dahlberg, Sippvägen 41, S-183 63 Täby, Sweden
[21] Appl. No.: 979,878
[22] PCT Filed: Aug. 30, 1991
[86] PCT No.: PCT/SE91/00572
§ 371 Date: Feb. 26, 1993
§ 102(e) Date: Feb. 26, 1993
[87] PCT Pub. No.: WO88/00157
PCT Pub. Date: Jan. 14, 1988

[30] Foreign Application Priority Data
Aug. 31, 1990 [SE] Sweden ............ 9002784-8
[51] Int. Cl.⁵ .......................................... F21V 5/04
[52] U.S. Cl. ........................ 362/153.1; 362/153; 362/299; 362/328
[58] Field of Search .......... 362/145, 153, 153.1, 362/298, 299, 300, 308, 327, 328, 331, 332, 339, 268

[56] References Cited
U.S. PATENT DOCUMENTS

| | | | |
|---|---|---|---|
| 1,730,325 | 10/1929 | Howe | 362/298 |
| 2,165,305 | 7/1939 | Ruths | 362/299 |
| 3,007,034 | 10/1961 | Reed et al. | 362/153 |
| 3,233,088 | 2/1966 | McDonald | 362/299 |
| 3,705,303 | 12/1972 | Willis, Jr. et al. | 362/308 |
| 4,161,770 | 7/1979 | Maurer | 362/309 |
| 4,316,241 | 2/1982 | Gulliksen | 362/268 |
| 4,369,488 | 1/1983 | Brun | 362/308 |
| 4,914,544 | 4/1990 | Dahlberg | 362/153.1 |

FOREIGN PATENT DOCUMENTS

| | | | |
|---|---|---|---|
| 696555 | 10/1964 | Canada | 362/308 |
| 805529 | 2/1969 | Canada | 362/308 |
| 1497339 | 7/1969 | Fed. Rep. of Germany | 362/308 |
| 624579 | 4/1927 | France | 362/331 |
| 537896 | 7/1940 | United Kingdom | 362/331 |
| 2172096 | 3/1986 | United Kingdom | 362/145 |

Primary Examiner—Ira S. Lazarus
Assistant Examiner—Y. Quach
Attorney, Agent, or Firm—Quarles & Brady

[57] ABSTRACT

Marker light e.g. for airfields with a casing adapted to be flush-mounted in the ground. A lower light source (2) emits an upwardly directed, collected bundle of light ($L_1$, $L_2$), which enters into a prism (4) with a lower planar surface and upper saw-tooth formations (17a, 17b), where the light rays are totally reflected and refracted obliquely upwards in two opposite directions. These rays will meet saw-tooth formations (16a, 16b) of an upper transparent cover plate (3) at an essentially right angle, said cover plate (3) having an upper, essentially planar or in two different directions slightly inclined surface (3a, 3b), where the light rays ($L_1'$, $L_2'$) are refracted so as to form two light beams ($L_1''$, $L_2''$) with a desired elevational angle relative to the ground level plane.

7 Claims, 2 Drawing Sheets

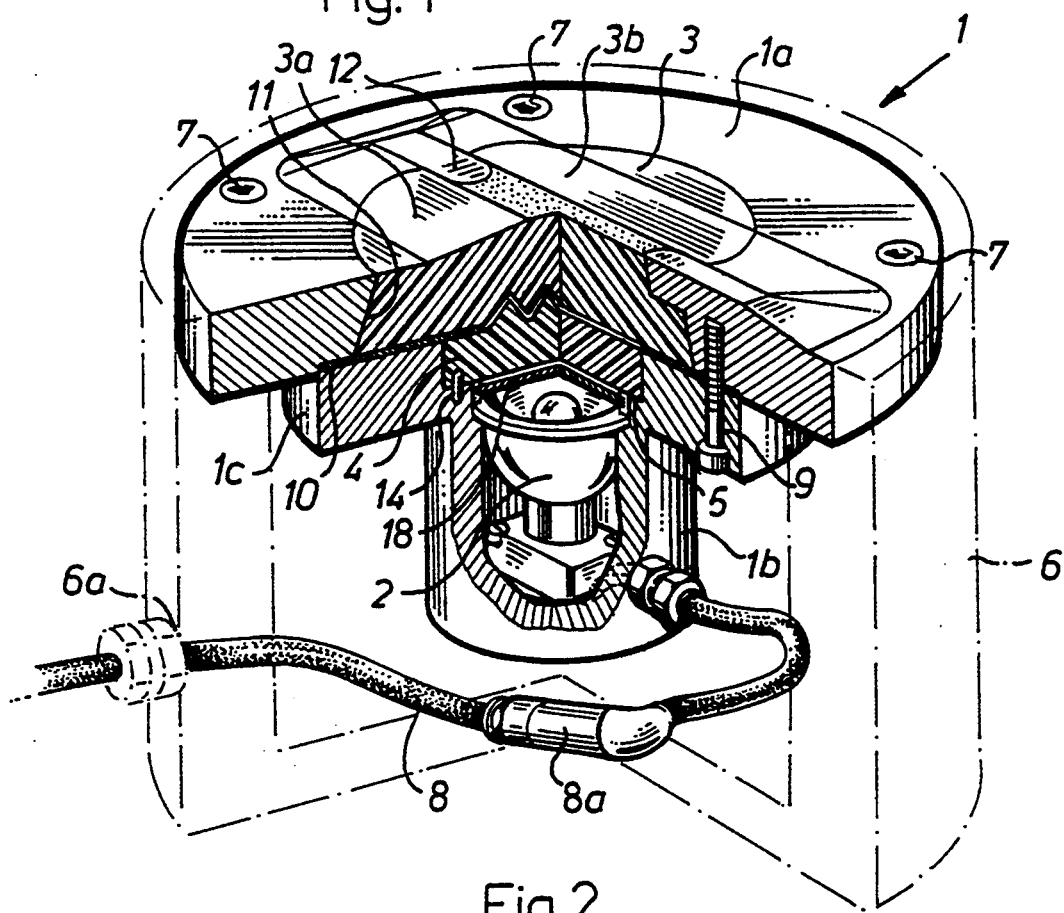
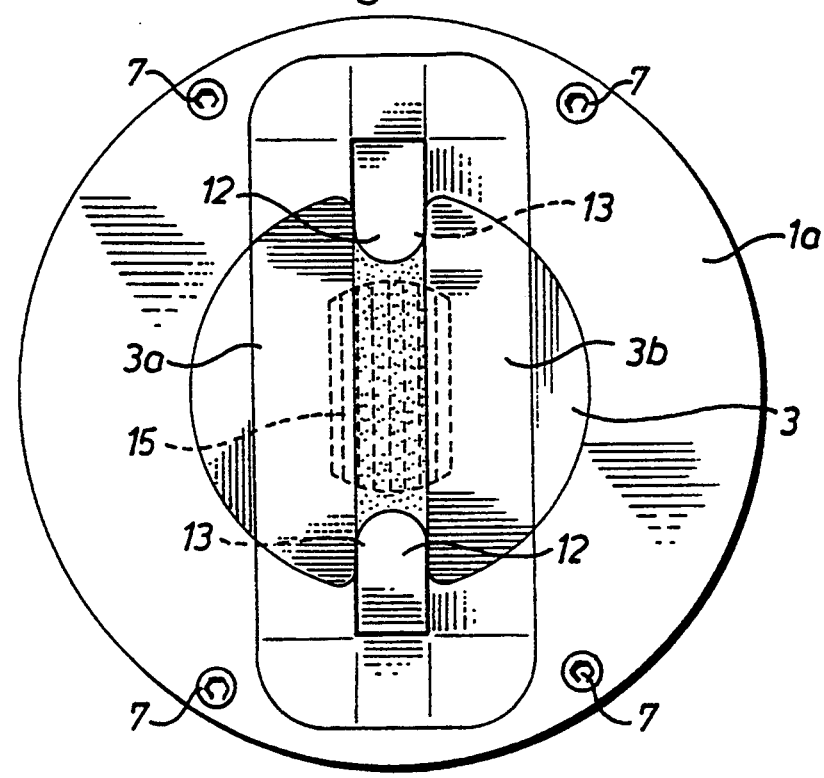

MARKER LIGHT

The invention relates to a marker light according to the preamble of claim 1.

Such marker lights are previously known from WO88/00157 wherein a marker light for airfields, e.g. for runways, taxistrips or the like is described. The marker light according to the invention is, however, generally useful also in other applications, where it is desired to have two oppositely directed light beams being emitted from a light fitting which is flush-mounted in the ground, e.g. in roadways, particularly as a lane marker, in interchanges, parking areas, storage areas and in other vehicle or pedestrian areas.

A well known problem with marker lights of this kind, particularly in airfields where relatively great light intensity is necessary in the emitted light beams, is associated with the heat development originating from the light source and the interaction of the light with different optical components in the fitting. Thus, there always has to be a compromise between the luminous efficiency, on the one hand, and the strength and the functional reliability of the construction materials under working conditions, the working life thereof, etc., on the other hand.

Against this background, the main object with the present invention is to achieve a marker light making it possible to obtain a high luminous efficiency and a high light intensity in spite of a relatively moderate temperature within the fitting and thus to maintain the strength and other functional properties as well as the necessary working life of the construction materials.

Secondary, although equally important objects are to achieve a compact fitting structure, relatively simple and non-expensive manufacture and assembly and low maintenance costs.

The above main object is achieved for a marker light of the kind defined above in that the prism, being located between the light source and the upper cover plate, has an essentially planar lower surface, being perpendicular to the upwardly directed light bundle from the light source, and an upper surface with at least one saw-tooth formation, the inclined surface portions of which having such angles of inclination that the inciding light will be redirected through total reflection at the respective inclined surface portion and be emitted under the least possible refraction in the respective adjacent, inclined surface portion, while at the same time maintaining said essentially perpendicular angle of incidence onto the lower saw-tooth surface portions of the cover plate and said desired vertical angle for the two light beams being emitted from the upper surface of the cover plate.

In this connection it should be mentioned that a prism with upwardly directed, inclined surface portions and a lower, horisontal surface is previously known per se from U.S. Pat No. 4,161,770. In the marker light according to this publication, however, the light beams are emitted directly from the upper pointed portion of the prism, which portion therefore protrudes above the slotted cover of the housing, said cover being located essentially in the ground-level plane. Thus, in this case, the marker light does not comprise an approximately planar transparent cover plate, but the pointed edge portion (with large angles of inclination) protrudes through the slot of the cover, which will lead to considerable inconveniences e.g. by snow clearance, wherein the prism could be damaged or displaced from its accurately adjusted position.

Through appropriate dimensioning of the angles of inclination of the inclined surface portions, taken into account the refractive index of the materials of the cover plate and the prism as well as the desired vertical angle relative to the ground level plane for the emitted light beams, it is possible to optimize the optical arrangements of the marker light according to the invention in such a way that after having been totally reflected at the respective inclined surface portion within the prism, the bundle portions,-being directed obliquely upwards in opposite directions will be refracted very little when being emitted from the adjacent inclined surface portions of the prism, as well as when entering into the corresponding saw-tooth portions of the lower side of the cover plate. Here, the rays of the bundle portions may form approximately, in practice however not exactly, a right angle to the inclined surface portion in question, whereby the heat development caused by refraction in the internal optic components of the marker light will be very small with associated advantages as to strength, in particular impact and wear resistance of the upper surface of the cover plate, dimensional stability and functional reliability during operation as well as increased working life. Optimizing the dimensioning of the respective angles of inclination can be carried out by one skilled in the art without too great an effort with the aid of classical optic laws, particularly Snell's refraction law, according to which the refractive index multiplied by sinus for the respective angle of incidence (to the normal) are equal on each side of a boundary surface between two different media.

Prefarebly, the saw-tooth shaped surface of the prism extends partly into the lower saw-tooth shaped surface of the cover plate, as set forth in claim 2. Hereby a satisfactory luminous efficiency will be obtained even if the saw-tooth shaped surface portions of the cover plate comprise an angle of inclination that exceeds 45° relative to the ground level plane (i.e. the plane of the cover plate). By letting the saw-tooth shaped surface portions of the prism project into the areas between the saw-tooth shaped surface portions of the cover plate, no shading effect will appear, nor will there be any undesired additional refraction in the adjacent surface portions or any secondary light beam caused thereby and directed in the wrong direction.

The saw-tooth surface of the prism therefore should project so far into the area of the saw-tooth surface of the cover plate that each emitted bundle portion from the respective inclined surface portion of the prism will incide onto the corresponding inclined surface portion of the cover plate and then pass above the adjacent inclined surface portion without interacting with the latter. Such an interaction could bring about the above mentioned undesired additional refraction.

By arranging the saw-tooth surface portions partly within each other, the total vertical extension of the optical components may be reduced which will result in a compact construction. The construction will be even more compact if the upper cover plate as well as the prism include a number of saw-tooth surface portions, particularly partly projecting into one another, as is stated in claim 3. Hereby, the total depth of the marker light may be relatively small and the casing of the fitting may be designed for installation into relatively shallow, particularly existing, holes in the ground.

Preferably a cover plate and/or prism is manufactured by hot pressing of a moulded work piece in a tool (c.f. claim 4), whereby subsegment treatment of the optically active surfaces in question will be unnecessary. Hereby, the manufacture will be considerably simplified and costworthy.

Further features and advantages of the invention will be apparent from the following detailed description of a preferred embodiment, with reference to the appended drawings.

FIG. 1 shows a marker light according to the invention in a perspective view, a part of the fitting being cut away for increased clarity;

FIG. 2 shows the marker light from above;

Figure 3:
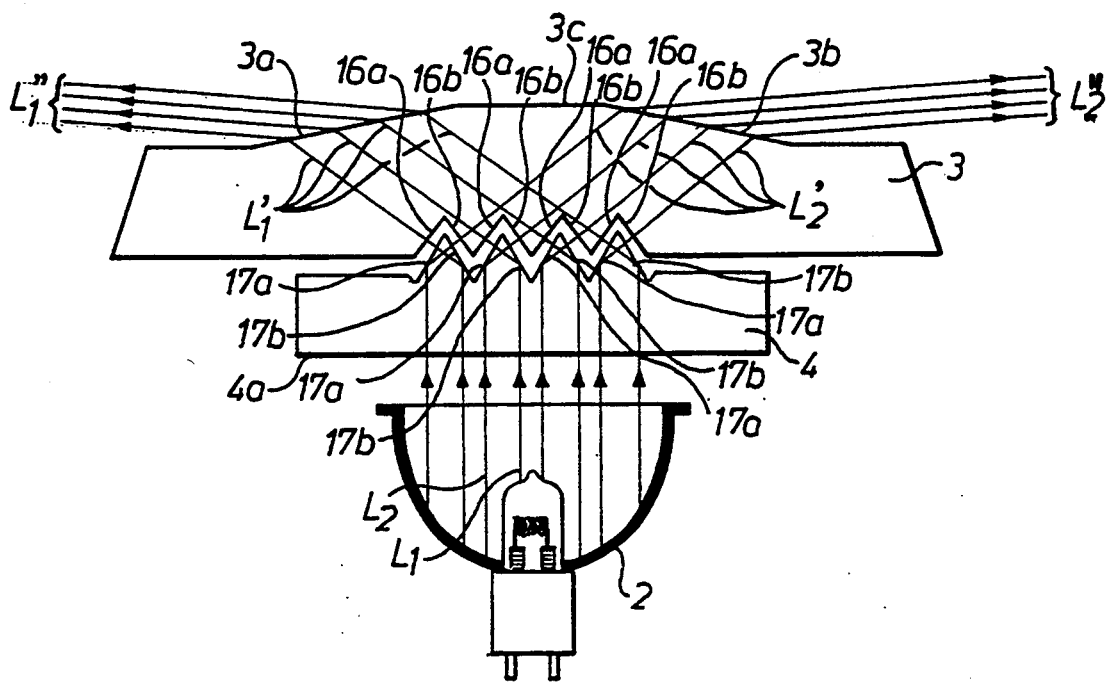
FIG. 3 shows the optical components schematically with the principal light beams.

The marker light shown in FIGS. 1 and 2 comprises (as well as the above mentioned marker light according to WO88/00157) an essentially cylindrical metal casing 1, particularly of an aluminium alloy, having a reflector lamp 2 mounted in its lower part and a transparent cover plate 3 disposed in its upper part and a likewise transparent prism 4 located thereunder, for dividing the upwardly directed, collected light bundle from the reflector lamp into two opposite bundle portions (c.f. FIG. 3) directed obliquely upwards. From the upper cover plate, oppositely directed light beams are emitted at a desired, particularly small angle to the ground level plane.

The casing 1 is in this case divided into two parts with an upper, essentially annular cover part 1a and a lower cylindrical part 1b containing the reflector lamp 2 and at its top being provided with an outwardly directed flange portion 1c with an inner seat 5 for the prism 4.

The cover part 1a of the casing is fixed in a well housing 6, which is indicated with dotted lines, by means of four screws 7, being countersunk in the upper surface of the cover part 1a. A cable connection 8 with a contact means 8a for electric supply to the reflector lamp 2 is contained in the lower free space of the well housing, and led through an opening 6a at the side of the well housing 6 to a cable channel (not shown) being disposed in the ground.

The lower part 1b of the casing is connected to the cover part 1a at the flange portion 1c by means of a number of screws 9, being inserted from below, a ring seal 10 being provided to guarantee the necessary tightness. By the connection of the two parts 1a, 1b of the casing it is at the same time guaranteed that the upper transparent cover plate 3 and the underlying prism 4 are being fixed in well defined positions since the upper cover plate 3 fits into an upwardly tapering, conical seat 11, being formed by the side portion of the inward recess of the cover part 1a, and lies with its radially outward, planar lower side against the ring seal 10 on top of the flange portion 1c. The cover plate is fixed in rotational direction by means of two oppositely disposed somewhat raised tongues 12, projecting a certain distance into the inward recess of the cover part 1a and fitting into a complementarily formed recess 13 in the transparent cover plate 3. Besides fixing the cover plate against rotation, these tongues serve as wear protectors, particularly against snow clearance by means of steel scraper blades or the like, and also to relieve from vertical loads (deriving from wheels of aeroplanes or vehicles), so that the stresses on the transparent, optically active cover plate 3 are diminished.

The underlying prism 4 is held in a fixed position between the inward seat 5 of the flange portion 1c and the seal 10 against the lower side of the cover plate 3 at its radially outward side portion. In the shown embodiment the prism is fixed against rotation by means of a number of fixing pins 14, preferably irregularly disposed and fitting into corresponding bores in the prism 4. The securing against rotation can of course also be achieved by special shoulders or the like at the seat 5 and corresponding recesses in the prism 4.

At the lower side of its center portion 15 (c.f. FIG. 2) the cover plate 3 is provided with a number of saw-tooth shaped, mutually parallel formations or recesses (four in the shown embodiment), forming in groups mutually parallel, inclined saw-tooth surface portions 16a and 16b, respectively (four of each in the shown embodiment, c.f. FIG. 3), and correspondingly the prism 4 is provided with an equally large number of saw-tooth shaped, likewise parallel formations or elevations, forming in groups parallel, inclined saw-tooth surface portions 17a and 17b, respectivly. As will be seen from FIGS. 3 and 4, the saw-tooth shaped formations project into each other in a gear-tooth-like manner, however, without contacting each other. Further, the angles of inclination are generally different for the surface portions 16a, 16b, on the one hand and the surface portions 17a, 17b, on the other hand.

The light source, i.e. the reflector lamp 2 in the shown embodiment, emits a collected, upwardly directed bundle with mutually parallel, vertically directed light rays $L_1$, $L_2$, striking the planar lower side 4a of the prism 4 at a right angle, so that the inavoidable losses due to certain reflection becomes minimal. The reflection ratio in the lower surface of the prism 4 may be reduced from normally about 4% to considerabely lower values by application of an anti-reflex coating to the lower surface 4a.

Figure 4:
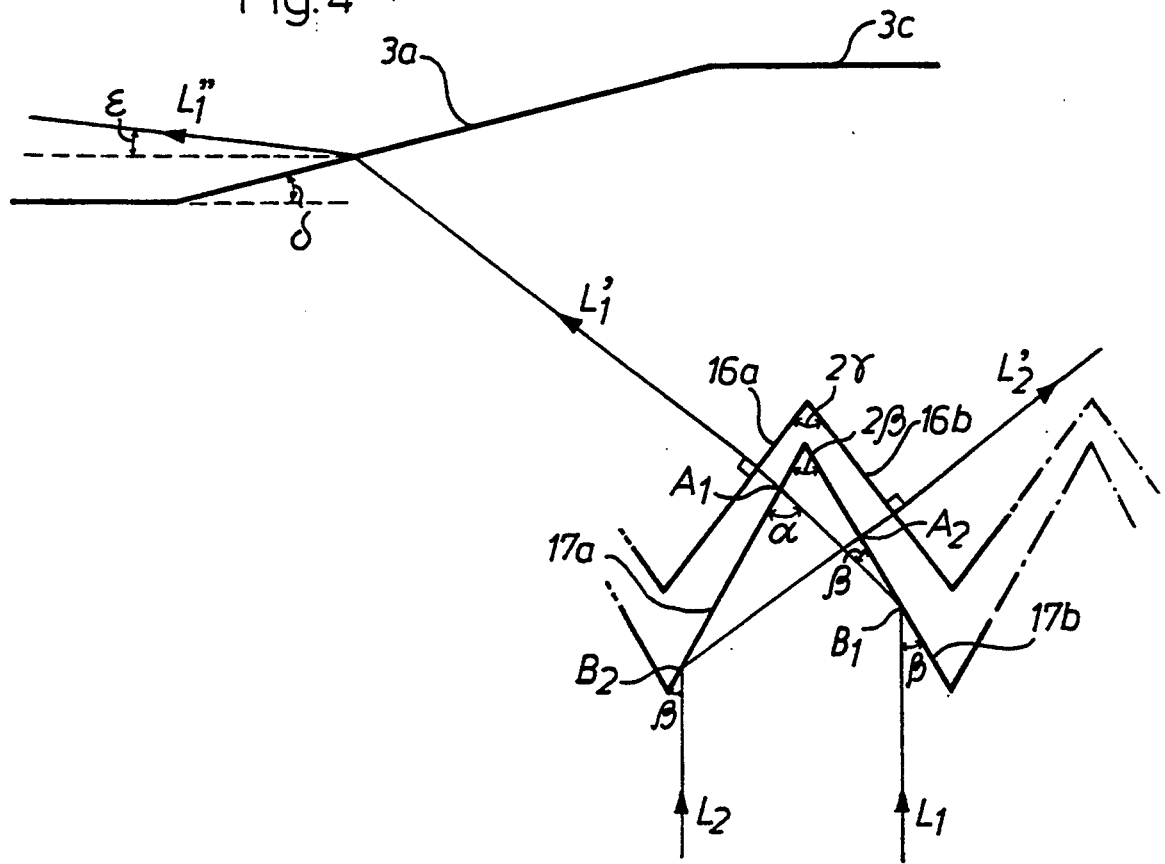
FIG. 4 shows a part of FIG. 3 with light beams in an increased scale.

Thus, the light rays $L_1$, $L_2$, continue vertically upwards through the prism 4 still in the form of a collected light bundle. The light rays $L_1$ (c.f. FIG. 4), which strike against the inclined surface portions 17b (the right part of the respective saw-tooth formation) are totally reflected at the boundary surface to the air between the lower and the upper saw-tooth formations (at $B_1$ for the ray $L_1$ in FIG. 4), so that these light rays $L_1$ are redirected obliquely upwards (to the left in FIGS. 3 and 4) and pass through the upper part of the adjacent inclined surface portion 17a of the same saw-tooth formation (at $A_1$ in FIG. 4). The light rays $L_2$ are correspondingly totally reflected against said adjacent surface portion 17a (at $B_2$ in FIG. 4) and redirected obliquely upwards (to the right in FIGS. 3 and 4), so that they will pass through the respective surface portion 17b (at $A_2$ in FIG. 4).

Provided that the cover plate 3 has a refractive index of 1.4 whereas the prism has a refractive index of 1.5;

the upper inclined portions 3a, 3b of the cover plate 3 have an angle of inclination $\delta = 9°$ to the ground level plane;

the emitted light beams $L_1''$ and $L_2''$ form an elevational angle $\epsilon = 3°$ to the ground level plane;

the geometry in the showed embodiment is chosen such that the saw-tooth formations 16a, 16b of the cover plate 3 form an acute aperture angle $2\gamma = 74°$ and that the saw-tooth formations 17a, 17b of the prism 4 form a yet more acute angle 2 $\beta=56°$ (see FIG. 4). This means that the light rays $L_1$ and $L_2$ strike the respective surface portion 17b, 17a at an angle of $\beta=28°$, which will lead to total reflection with the same angle $\beta$ and an angle of incidence $\alpha=56° +28°=84°$ against the adjacent surface portion 17a, 17b, respectively, i.e. 6° to the normal. By refraction in this boundary surface (against air) an outgoing angle of 9° to the normal will occur according to Snell's law of refraction (refractive index 1.5 in the prism 4) or 37° relative to the ground level plane, whereby the redirected light rays $L_1$ and $L_2$ will incide perpendicularly onto the respective saw-tooth surface portions 16a and 16b of the cover plate and together form two oppositely directed bundle portions $L_1'$ and $L_2'$ (see FIGS. 3 and 4), which form an angle of 37° with the ground level plane.

Thus, the angle of incidence against the slightly inclined ($\delta=9°$) upper surface portions 3a, 3b of the cover plate 3, will become 90° −37° −9° =44° to the normal, which will lead to an outgoing angle of 78° to the normal (refractive index 1.4 in the cover plate 3), i.e. the desired elevational angle $\epsilon=90° -78° -9° =3°$.

It is obvious from FIG. 4 that even the light ray $L_2$, which incides onto the point $B_2$ of the surface portion 17a, i.e. close to the lower edge portion between the adjacent surface portions 17a and 17b, will go free from the adjacent (to the right) saw-tooth formation 16a, 16b (dashed) of the cover plate 3 after refraction at $A_2$, passage through the intermediate air space and entrance into the cover plate 3 through the surface portion 16b. Thus, no matter where the total reflection against the surfaces 17a, 17b occurs, all rays $L_1$ and $L_2$ will pass through the cover plate 3 without meeting any boundary surfaces, until the respective bundle portion $L_1$, $L_2$ reaches the upper, slightly inclined surfaces 3a and 3b, respectively, in which they are refracted towards the ground level plane and form the emitted light beams $L_1''$ and $L_2''$, respectively.

In the shown embodiment the thickness of the cover plate 3 is such, that the bundle portions $L_1'$ and $L_2'$ will be completely separated at the top in the vicinity of the upper side of the cover plate 3, whereby thus an optical dead zone will be formed in the central strip-like portion 3c between the slightly inclined portions 3a, 3b. In the shown embodiment, this strip-like portion 3c, which extends between the opposite tongues 12 of the cover portion 1a, has a planar configuration. If the cover plate 3 is made thinner (or if the saw-tooth formations occupy a greater area transversely to the edges of the saw-teeth, i.e. an area of extension in the plane of the drawing according to FIG. 3), such a dead zone may be left out, the inclined portions 3a, 3b being limited by a sharp edge. Alternatively, the emitted light beams $L_1''$ and $L_2''$ may partially overlap one another, if the upper surface of the cover plate 3 is entirely planar, which is possible if a material with a higher refractive index, and more obtuse saw-tooth formations, are chosen or if the elevational angle $\epsilon$ of the emitted light beams is essentially greater than 3°.

The emitted light beams $L_1''$ and $L_2''$ could be given a desired colour through arrangement of a colour filter between the light source 2 and the prism 4, for instance in the form of a filter plate 18 (FIG. 1) above the reflector lamp 2 or as a surface coating on the planar lower side of the prism 4.

It is obvious that the geometry (the thickness of the cover plate 3 and the prism 4 and the angles $\alpha$, $\beta$, $\gamma$, and $\delta$) as well as the materials (and thus the refractive index) of the cover plate 3 and the prism 4 may be chosen at will by those skilled in the art with proper adjustment of the different parameters. Hereby, a great freedom in the choice of materials and geometry is obtained by making the saw-tooth formations either acute or obtuse and choosing mutually different angles of inclination of the lower saw-tooth formations 16a, 16b of the cover plate 3, on the one hand and the upper saw-tooth formations 17a, 17b of the prism 4 on the other hand. At the same time, however, established norms concerning strength and resistance at occuring temperatures must be taken into account. For example, as a material of the cover plate 3 and or the prism 4 one can choose either glass or various types of plastic materials, e.g. epoxy or acrylic plastics or the plastic material, which is marketed under the name MEGITHAN.

I claim:

1. Marker light comprising a casing (1) to be flush-mounted into the ground, comprising:
   a lower light source (2) adapted to emit a collected upwardly directed light bundle ($L_1$, $L_2$),
   a prism (4) placed above the light source with inclined surfaces adapted to divide said upwardly directed light bundle into two bundle portions ($L_1'$, $L_2'$) being directed obliquely upwards in opposite directions, and
   an upper cover plate (3), being transparent at least in an area of each of said bundle portions, said cover plate including essentially upper planar surfaces (3a, 3b) said upper cover plate having an upper surface lying essentially in a ground level plane, and with a lower surface having saw-tooth surface portions (16a, 16b), said prism (4) inclined surfaces and said saw-tooth surface portions (16a, 16b) being mutually adapted in such a way that said obliquely upwards directed light bundle portions will incide essentially perpendicularly onto the respective saw-tooth surface portion (16a, 16b) and, after passage through the upper cover plate (3), be refracted in the planar upper surfaces thereof, so that two light beams ($L_1''$, $L_2''$) are emitted in opposite directions at a desired vertical angle ($\epsilon$) to the ground level plane, characterized in that said prism (4) has an essentially planar lower surface (4a) being perpendicular to the upwardly directed light bundle ($L_1$, $L_2$) from the light source (2), and an upper surface with at least one saw-tooth formation, the inclined surface portions (17a, 17b) of which having angles of inclination such that the inciding light will be redirected through total reflection at the respective inclined surface portions (17a, 17b) and be emitted under the least possible refraction in the respective adjacent, inclined surface portions (17a, 17b) while at the same time maintaining said essentially perpendicular angle of incidence onto the lower saw-tooth surface portions of the cover plate, and said two light beams ($L_1''$, $L_2''$) being emitted from the upper planar surface of the cover plate at said desired vertical angle ($\epsilon$).

2. Marker light according to claim 1, characterized in that the upper saw-tooth surface portions (17a, 17b) of the prism (4) extends partly into the lower saw-tooth surface portions (16a, 16b) of the cover plate (3).

3. Marker light according to claim 1 characterized in that the upper cover plate (3) as well as the prism (4) are provided with a plurality of matching saw-tooth surface formations (16a, 16b, 17a, 17b).

4. Marker light according to claim 1, characterized in that at least one of the cover plate (3) and the prism (4) is manufactured through hot pressing of a molded work piece in a tool.

5. Marker light according to claim 2, characterized in that the upper cover plate (3) as well as the prism (4) are provided with a plurality of matching saw-tooth surface formations (16a, 16b, 17a, 17b).

6. Marker light according to claim 2, characterized in that at least one of the cover plate (3) and the prism (4) is manufactured through hot pressing of a molded work piece in a tool.

7. Marker light according to claim 3, characterized in that at least one of the cover plate (3) and the prism (4) is manufactured through hot pressing of a molded work piece in a tool.

* * * * *